United States Patent [19]
Yamaguchi et al.

[11] Patent Number: 5,122,634
[45] Date of Patent: Jun. 16, 1992

[54] WELDING TRANSFORMER CONTROL APPARATUS

[75] Inventors: Teruzo Yamaguchi; Tatsuo Morita, both of Tokyo, Japan

[73] Assignee: Obara Corporation, Tokyo, Japan

[21] Appl. No.: 609,155

[22] Filed: Nov. 2, 1990

[30] Foreign Application Priority Data
Nov. 6, 1989 [JP] Japan .................. 1-129170

[51] Int. Cl.$^5$ ............................................. B23K 11/24
[52] U.S. Cl. ..................................... 219/110; 219/116
[58] Field of Search ........................ 219/108, 110, 116

[56] References Cited

U.S. PATENT DOCUMENTS

| | | | |
|---|---|---|---|
| 4,289,948 | 9/1981 | Jurek et al. ........................... | 219/110 |
| 4,465,918 | 8/1984 | Kiriyama et al. ..................... | 219/110 |
| 4,954,686 | 9/1990 | Izume .................................... | 219/110 |
| 4,999,477 | 3/1991 | Yamaguchi et al. . | |

Primary Examiner—Clifford C. Shaw
Attorney, Agent, or Firm—Flynn, Thiel, Boutell & Tanis

[57] ABSTRACT

There is disclosed a welding transformer control apparatus capable of controlling the voltage supplied to the primary winding of the welding transformer. The welding transformer control apparatus comprises a voltage detecting circuit connected to the thyristor for detecting a power voltage and a digital operation unit connected to the voltage detecting circuit via an A/D converter for receiving the digital converted power voltage. The digital operation unit is also connected to a voltage setting unit for receiving a predetermined voltage to be supplied to the primary winding of the welding transformer. The digital operation unit compares the predetermined voltage supplied from the voltage setting unit with the power voltage supplied from the A/D converter and provides a signal to suppress the power voltage under the predetermined voltage. There is also provided a thyristor gate pulse generator connected between the digital operation unit and the thyristor for receiving the signal from the digital operation unit and providing a thyristor gate pulse to the thyristor so that the thyristor can effect striking cnrol, i.e., phase control of the power supplied in the primary winding of the welding transformer whereby the voltage supplied to the primary winding of the welding transformer can be controlled under the desired voltage.

8 Claims, 2 Drawing Sheets

WELDING TRANSFORMER CONTROL APPARATUS

BACKGROUND OF THE INVENTION

1. Field of the Invention

The present invention relates to a welding transformer control apparatus provided with a thyristor in a resistance welding machine.

2. Prior Art

The conventional welding transformer control apparatus of this type operates to measure a current supplied to a primary winding or a secondary winding of a welding transformer and effect striking control, i.e., phase control by a thyristor at the primary winding of the welding transformer whereby the current supplied to the secondary winding of the welding transformer is controlled.

Since power voltage is generarlly varied greatly, the core of the transformer is sized so as not to generate magnetic saturation when the maximum voltage is supplied thereto. Hence, the power voltage has not been taken into consideration to control the prior art welding transformer.

There is a problem in that the transformer is large sized and heavyweight if the welding transformer is designed not to generate magnetic saturation when the maximum voltage is supplied to the welding transformer.

The present invention has been made in view of the problem set forth above and to provide a welding transformer control apparatus which permits the sue of a small sized and lightweight transformer, and is capable of preventing voltage greater than a predetermined voltage from being supplied to the welding transformer.

The welding transformer control apparatus comprises a voltage detecting circuit connected to a thyristor for detecting power voltage and a digital operation unit connected to the voltage detecting circuit via an A/D converter for receiving the digitized power voltage. The digital operation unit is also connected to a voltage setting unit for receiving a predetermined voltage to be supplied to the primary winding of the welding transformer. The digital operation unit compares the predetermined voltage supplied from the voltage setting unit with the power voltage supplied from the A/D converter and provides a signal to suppress the power voltage under the predetermined voltage. There is also provided a thyristor gate pulse generator connected between the digital operation unit and the thyristor for receiving the signal from the digital operation unit and providing a thyristor gate pulse to the thyristor so that the thyristor can effect striking control, i.e., phase control of the power supplied in the primary winding of the welding transformer whereby the voltage supplied to the primary winding of the welding transformer can be controlled under the desired voltage.

The above and other objects, features and advantages of the present invention will become more apparent from the following description taken in conjunction with the accompanying drawings.

DESCRIPTION OF THE PREFERRED EMBODIMENT

Figure 1:
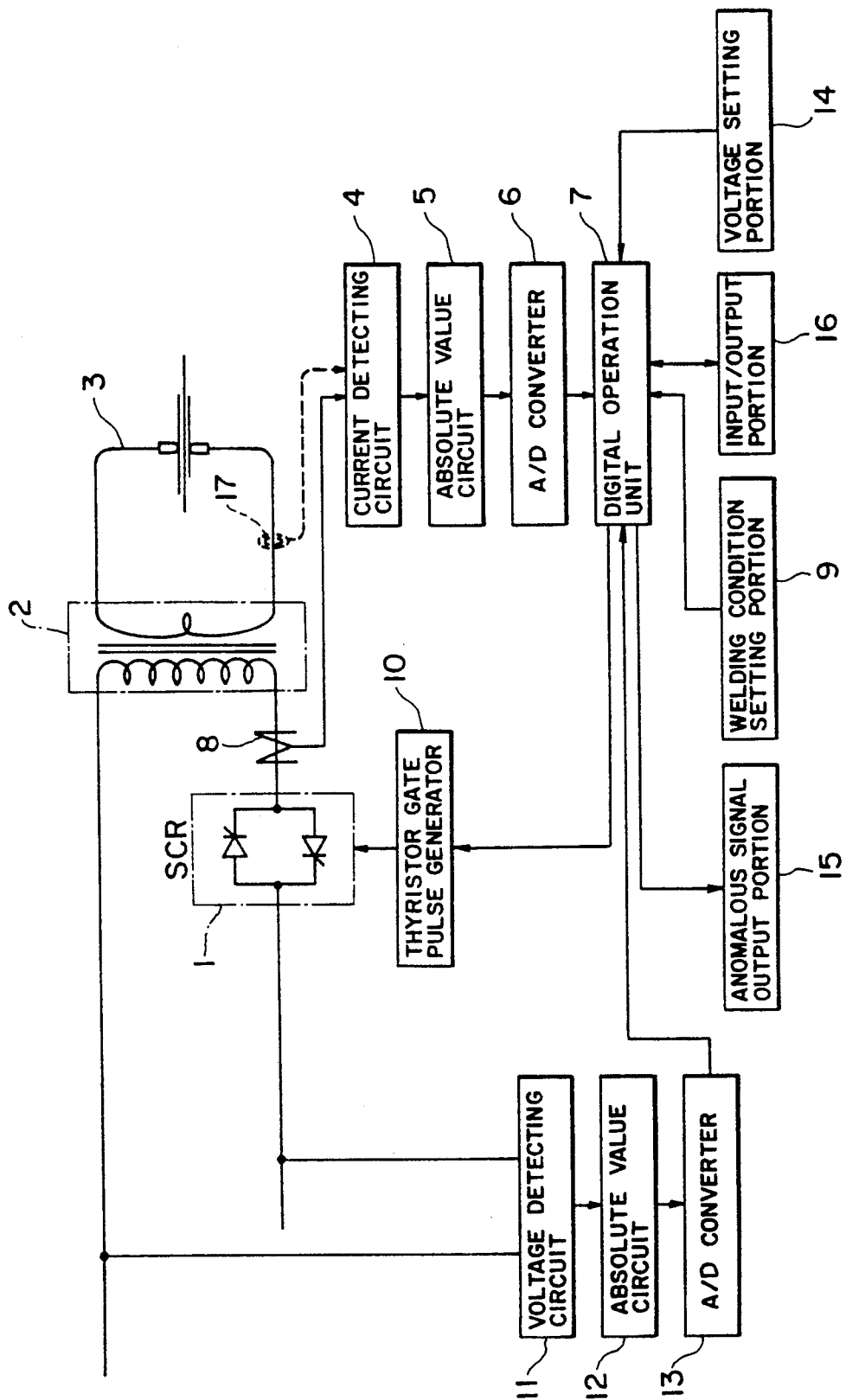
FIG. 1 is a block diagram of assistance in explaning a welding transformer control apparatus according to the preferred embodiment of the present invention.

A welding transformer control apparatus according to a preferred embodiment of the present invention will be described with reference to FIG. 1.

The welding transformer control apparatus comprises a thyristor or a silicon controlled rectifier (hereinafter referred to as SCR) 1 connected to a power source and a primary winding of a welding transformer 2, a current transformer (hereinafter referred to as CT) 8 connected between the thyristor 1 and the primary winding of the welding transformer 2 for detecting the current supplied to the primary winding of the transformer 2, a current detecting circuit 4 connected to the CT 8 for receiving the current detected by the CT 8, an absolute value circuit 5 connected to the current detecting circuit 4, an analog to digital converter 6 (hereinafter referred to as A/D converter) connected to the absolute value circuit 5 for connecting the analog value of the current to a digital value of the current, a digital operation unit 7 connected to the A/D converter 6 for receiving the current value from the A/D converter 6. A resistance welding machine 3 is connected to the secondary winding of the welding transformer 2. The current detecting circuit 4 can be connected to a torsidal core 17 positioned in the secondary winding of the welding transformer 2. The digital operation unit 7 receives a predetermined welding current from a welding condition setting unit 9 and issues a signal so as to make the difference between the predetermined welding current and the converted current zero. A thyristor gate pulse generator 10 connected between the digital operation unit 7 and the thyristor 1 provides a gate pulse signal to the thyristor 1 upon reception of the signal from the digital operation unit 7 so that the thyristor 1 can effect striking control, i.e., phase control of the power supplied in the primary winding of the welding transformer 2.

Inasmuch as the power voltage is in general varied, there is a likelihood that a considerable amount of voltage is supplied to the welding transformer 2 when the phase control is made disregarding the power voltage. Hence, there is provided a voltage detecting circuit 11 between the power source and the primary winding of the welding transformer 2 for measuring and monitoring the power voltage. The power voltage detected by the voltage detecting circuit 11 is supplied via an absolute value circuit 12 to an analog to digital converter 13 (hereinafter referred to as A/D converter) where the analog value of the voltage is converted to a digital value of the voltage. The power voltage is provided from the A/D converter 13 to the digital operation unit 7. The digital operation unit 7 receives a predetermined voltage from a voltage setting unit 14 and compares it with the power voltage supplied from the A/D converter 13. The digital operation unit 7 provides a signal to the thyristor gate pulse generator 10 to suppress the power voltage under the predetermined voltage when the power voltage exceeds the predetermined voltage. The thyristor gate pulse generator 10 provides a gate pulse signal to the thyristor 1, upon reception of the signal from the digital operation unit 7. The thyristor 1 effects, upon reception of the gate pulse signal from the thyristor gate pulse generator 10, striking control, i.e., phase control of the power supplied in the primary winding of the welding transformer under the predetermined voltage.

With the arrangement of the welding transformer control apparatus according to the preferred embodiment of the present invention, the voltage greater than the predetermined voltage is not supplied to the welding transformer 2 when the welding current in the primary or secondary winding of the welding transformer is detected so that the thyristor can effect striking control, i.e., phase control of the power supplied in the primary winding of the welding transformer whereby the secondary winding of the transformer is controlled under the constant current.

Figure 2:
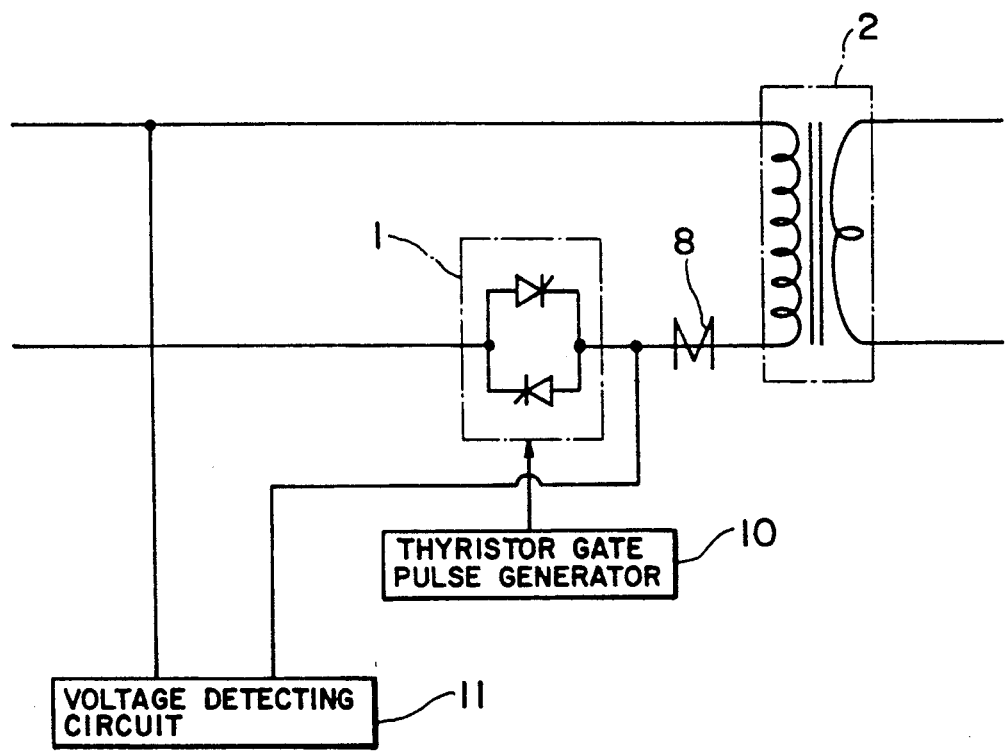
FIG. 2 is a partly cut away block diagram showing a welding transformer control apparatus according to another embodiment of the present invention.

According to the preferred embodiment, the voltage detecting circuit 11 is connected to the thyristor 1 at the side of the power source but it may be connected to the thyristor 2 at the side of the primary winding of the transformer 2 as illustrated in FIG. 2.

As mentioned above, the voltage greater than the predetermined voltage is not supplied to the welding transformer, hence the transformer can be designed with ease without taking into consideration the safety factor thereof. Furthermore, since the size of the core of the welding transformer need not be increased beyond necessity, the transformer can be small sized and lightweight. Still furthermore, since magnetic saturation of the welding transformer can be prevented, there is no danger of burning the welding transformer by magnetic saturation and stopping of the welding operation due to breakage of the thyristor.

Although the invention has been described in its preferred form with a certain degree of particularity, it is to be understood that many variations and changes are possible in the invention without departing from the scope thereof.

What is claimed is:

1. A welding transformer control apparatus, comprising: a welding transformer having a primary winding connectable to an electric power source, and a secondary winding, a means connected to the welding transformer for detecting the actual current supplied to the primary winding of the welding transformer, a thyristor connected between the power source and the primary winding, a current detecting circuit for receiving the detected actual current, a digital operation unit connected to the current detecting circuit via an A/D converter for receiving a digitally converted current from the A/D converter and connected to a welding condition setting unit for receiving therefrom a predetermined current, the digital operation unit including means for issuing a first signal which initiates control of the thyristor so as to make the difference between the actual current and the predetermined current zero, a thyristor gate pulse generator means connected between the digital operation unit and the thyristor for providing a first gate pulse to the thyristor upon reception of the first signal from the digital operation unit so that the thyristor can effect phase control of the power supplied in the primary winding of the welding transformer whereby the current supplied to the secondary winding of the welding transformer is controlled;

a voltage detecting circuit connected with the thyristor and the power source for detecting a power voltage applied to the primary winding by the power source;

an absolute value circuit connected to the voltage detecting circuit for receiving the power voltage detected by the voltage detecting circuit;

an A/D converter connected to the absolute value circuit for converting an analog value of the power voltage supplied by the absolute value circuit to a digital value of the power voltage, said digital operation unit being connected between the A/D converter and the thyristor gate pulse generator for receiving the voltage;

a voltage setting means connected to the digital operation unit for supplying a predetermined voltage which represents a maximum permissible voltage level that may be supplied to the primary winding of the welding transformer;

the digital operation unit including means for comparing the predetermined voltage supplied from the voltage setting means with the power voltage supplied from the A/D converter and providing a second signal which initiates control of the thyristor to suppress the power voltage applied to the primary winding to a voltage level under the predetermined voltage; and the thyristor gate pulse generator means including means for receiving the second signal from the digital operation unit and providing a second gate pulse to the thyristor in response to the second signal so that the thyristor can effect phase control of the power supplied in the primary winding of the welding transformer whereby the power voltage supplied to the primary winding of the welding transformer can be controlled at a voltage level under the predetermined voltage.

2. A welding transformer control apparatus according to claim 1, wherein said means for detecting actual current includes a current transformer connected to the primary winding.

3. A welding transformer control apparatus according to claim 2, wherein said voltage detecting circuit is connected between the power source and the thyristor.

4. A welding transformer control apparatus according to claim 3, wherein the thyristor is an SCR.

5. A welding transformer control apparatus according to claim 2, wherein the voltage detecting circuit is connected between the thyristor and the primary winding of the welding transformer.

6. A welding transformer control apparatus according to claim 1, wherein said means for detecting actual current includes a toroidal core positioned in the secondary winding of the welding transformer.

7. A welding transformer control apparatus according to claim 6, wherein the voltage detecting circuit is directly connected to a point between the thyristor and the primary winding of the welding transformer, and is also directly connected to the primary winding at an end thereof opposite the thyristor.

8. A welding transformer control apparatus according to claim 1, wherein the voltage detecting circuit is directly connected to a point between the thyristor and the primary winding of the welding transformer, and is also directly connected to the primary winding at an end thereof opposite the thyristor.

* * * * *